United States Patent
Gummadi et al.

(10) Patent No.: US 12,423,987 B2
(45) Date of Patent: Sep. 23, 2025

(54) SYSTEM AND METHOD FOR DETERMINING OBJECT CHARACTERISTICS IN REAL-TIME

(71) Applicant: DEKA Products Limited Partnership, Manchester, NH (US)

(72) Inventors: Raajitha Gummadi, Manchester, NH (US); Abhayjeet S. Juneja, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 409 days.

(21) Appl. No.: 17/506,099

(22) Filed: Oct. 20, 2021

(65) Prior Publication Data
US 2022/0129685 A1    Apr. 28, 2022

Related U.S. Application Data (60) Provisional application No. 63/104,593, filed on Oct. 23, 2020.

(51) Int. Cl.
| | | |
|---|---|---|
| G06V 20/58 | (2022.01) | |
| G06T 5/20 | (2006.01) | |
| G06T 7/62 | (2017.01) | |
| G06T 7/70 | (2017.01) | |

(52) U.S. Cl.
CPC ............. *G06V 20/58* (2022.01); *G06T 5/20* (2013.01); *G06T 7/62* (2017.01); *G06T 7/70* (2017.01); *G06T 2207/10028* (2013.01); *G06T 2207/20032* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,559,673 | B2 | 10/2013 | Fairfield et al. |
| 9,251,598 | B2 | 2/2016 | Wells et al. |
| 9,535,423 | B1 * | 1/2017 | Debreczeni .......... G05D 1/0278 |
| 10,108,867 | B1 | 10/2018 | Vallespi-Gonzalez et al. |
| 10,310,087 | B2 | 6/2019 | Laddha et al. |
| 10,762,396 | B2 | 9/2020 | Vallespi-Gonzalez et al. |

(Continued)

FOREIGN PATENT DOCUMENTS

| | | |
|---|---|---|
| EP | 3644276 A1 | 4/2020 |
| WO | WO2016170333 A1 | 10/2016 |

OTHER PUBLICATIONS

C. R. Qi, W. Liu, C. Wu, H. Su and L. J. Guibas, "Frustum PointNets for 3D Object Detection from RGB-D Data," 2018 IEEE/CVF Conference on Computer Vision and Pattern Recognition, Salt Lake City, UT, USA, 2018, pp. 918-927, doi: 10.1109/CVPR.2018.00102. (Year: 2018).*

(Continued)

*Primary Examiner* — Utpal D Shah
(74) *Attorney, Agent, or Firm* — William A. Bonk, III (57) ABSTRACT

System and method for object detection. Images from cameras are provided to an inference engine to detect objects in real time, providing the images to an inference engine to detect the non-background and background pixels of the objects in the images, determining the position and size of the objects in the images based on contemporaneously gathered LiDAR data and the relationship of non-background to background pixels.

22 Claims, 9 Drawing Sheets

(56) References Cited

U.S. PATENT DOCUMENTS

| | | | |
|---|---|---|---|
| 11,216,971 B2* | 1/2022 | Xu | G06F 18/253 |
| 2012/0083960 A1 | 4/2012 | Zhu et al. | |
| 2014/0180914 A1 | 6/2014 | Abhyanker | |
| 2018/0326982 A1 | 11/2018 | Paris et al. | |
| 2019/0147245 A1 | 5/2019 | Qi et al. | |
| 2019/0317217 A1* | 10/2019 | Day | G01S 7/484 |
| 2019/0318177 A1* | 10/2019 | Steinberg | G01S 7/4808 |
| 2020/0309957 A1* | 10/2020 | Bhaskaran | G01S 17/86 |
| 2020/0394824 A1* | 12/2020 | Kanzawa | G06V 20/58 |
| 2020/0394848 A1* | 12/2020 | Choudhary | G06T 19/20 |
| 2020/0410716 A1* | 12/2020 | Seo | G06T 7/70 |
| 2021/0150230 A1* | 5/2021 | Smolyanskiy | G06V 10/82 |
| 2023/0351724 A1* | 11/2023 | Hou | G06T 7/70 |

OTHER PUBLICATIONS

R. Barea et al., "Integrating State-of-the-Art CNNs for Multi-Sensor 3D Vehicle Detection in Real Autonomous Driving Environments," 2019 IEEE Intelligent Transportation Systems Conference (ITSC), Auckland, New Zealand, 2019, pp. 1425-1431, doi: 10.1109/ITSC.2019.8916973. (Year: 2019).*

C. R. Qi, W. Liu, C. Wu, H. Su, and L. J. Guibas, "Frustum pointnets for 3D object detection from RGB-D Data," 2018 IEEE/CVF Conference on Computer Vision and Pattern Recognition, Jun. 2018. doi:10.1109/cvpr.2018.00102 (Year: 2018).*

M. Hofmann, P. Tiefenbacher and G. Rigoll, "Background segmentation with feedback: The Pixel-Based Adaptive Segmenter," 2012 IEEE Computer Society Conference on Computer Vision and Pattern Recognition Workshops, Providence, RI, USA, 2012, pp. 38-43, doi: 10.1109/CVPRW.2012.6238925 (Year: 2012).*

G. B. Coleman and H. C. Andrews, "Image segmentation by clustering," in Proceedings of the IEEE, vol. 67, No. 5, pp. 773-785, May 1979, doi: 10.1109/PROC.1979.11327. (Year: 1979).*

International Search Report & Written Opinion mailed Sep. 13, 2021, issued in PCT Patent Application No. PCT/US2021/024445, 18 pages.

Bansal, M. et al., "ChauffeurNet: Learning to Drive by Imitating the Best and Synthesizing the Worst", Dec. 7, 2018, 20 pages.

Dubrofsky, E., "Homography Estimation by Elan Dubrofsky, B.Sc., Carleton University, 2007, A Master's Essay Submitted in Partial Fulfillment of the Requirements for the Degree of Master of Science in The Faculty of Graduate Stuides (Computer Science)", The University of British Columbia (Vancouver) Mar. 2009, 32 pages.

Fairfield, N. et al., "Traffic light mapping and detection", 2011 IEEE International Conference on Robotics and Automation, Shaghai, 2011, pp. 5421-5426 (6 pages).

Waslander, S. et al., "Lesson 3: Handling an Intersection Scenario With Dynamic Objects, Computer Science Software Development, a course that is part of the Self-Driving Cars Specialization, Motion Planning for Self-Driving Cars", regarding a course offered by University of Toronto on/before May 8, 2019 (5 pages). https://www.coursera.org/lecture/motion-planning-self-driving-cars/lesson-3-handling-anintersection-scenario-with-dynamic-objects-F1Z1g.

Waslander, S. et al., "Lesson 2: Handling an Intersection Scenario Without Dynamic Objects, Computer Science Software Development, a course that is part of the Self-Driving Cars Specialization, Motion Planning for Self-Driving Cars", regarding a course offered by University of Toronto on/before May 8, 2019 (5 pages), https://www.coursera.org/lecture/motion-planning-self-driving-cars/lesson-2-handling-an-intersection-scenario-without-dynamic-objects-aAxIX.

Kammel, S. et al. (2009) Team AnnieWAY's Autonomous System for the DARPA Urban Challenge 2007. In: Buehler M., Iagnemma K., Singh S. (eds) The DARPA Urban Challenge. Springer Tracts in Advanced Robotics, vol. 56. Springer, Berlin, Heidelberg (35 pages).

Kearney, J. et al. "Traffic Generation for Studies of Gap Acceptance", The University of Iowa, DSC 2006 Europe—Paris—Oct. 2006 (10 pages).

Van Der Horst, et al., "Time-To-Collision and Collision Avoidance Systems", 6th ICTCT workshop Salzburg, Proceedings, Jan. 1994 (13 pages).

Stanford Driving Software Website, "Software Infrastructure for Stanford's Autonomous Vehicles", posted Feb. 6, 2016, last updated Aug. 20, 2016 (https://sourceforge.net/projects/stanforddriving/).

Urmson, Chris et al., "Autonomous Driving in Urban Environments Boss and the Urban Challenge", Journal of Field Robotics (2008), pp. 426-466 (41 pages).

Liu, Changliu et al. "Speed Profile Planning in Dynamic Environments Via Termporal Optimization", Conference Paper, DOI: 10.1109/IVS.2017.7995713, Jun. 2017 (6 pages).

Invitation to Pay Additional Fees and, Where Applicable, Protest Fee issued Jul. 21, 2021 in PCT Patent Application No. PCT/US2021/024445, 13 pages.

* cited by examiner

| | 9321 | 9323 | 9325 | 9327 |
|---|---|---|---|---|
| POINT# | X,Y | $\sqrt{X^2+Y^2}$ | ≤ LOW+.25 | MED±0.25 |
| D1 | 4,1 | 4.12 | Y | N |
| D2 | 4,2 | 4.47 | N | Y |
| D3 | 5,1 | 5.09 | N | Y |
| D4 | 5,2 | 5.38 | N | N |
| E1 | 5,4 | 6.40 | Y | N |
| E2 | 5,5 | 7.07 | N | Y |
| E3 | 6,4 | 7.21 | N | Y |
| E4 | 6,5 | 7.81 | N | N |
| E5 | 7,4 | 8.06 | N | N |
| E6 | 7,5 | 8.60 | N | N |
| F1 | 8,7 | 9.22 | Y | N |
| F2 | 8,6 | 10.0 | N | Y |
| F3 | 9,7 | 11.4 | N | N |

SYSTEM AND METHOD FOR DETERMINING OBJECT CHARACTERISTICS IN REAL-TIME

CROSS REFERENCE TO RELATED APPLICATIONS

This application claims the benefit of U.S. Provisional Application Ser. No. 63/104,593, filed Oct. 23, 2020, entitled SYSTEM AND METHOD FOR DETERMINING OBJECT CHARACTERISTICS IN REAL-TIME, which is incorporated herein by reference in its entirety.

BACKGROUND

To navigate an autonomous vehicle (AV) safely, it is necessary to avoid obstacles, both mobile and static. Any type of obstacle avoidance requires receiving and processing sensor data from the AV. When objects around the AV are moving, it is necessary to predict object trajectories and speeds, and thus future positions of the objects. For either moving or static objects, it is necessary to determine their sizes in order to avoid encountering them. Sensors that can assist in real-time obstacle avoidance can include cameras, radar, LiDAR, and others. The number and sizes of the sensors can be limited by the size and cost point of the AV upon which the sensors are mounted, among other limiting factors. Objects can be detected in several different ways including, but not limited to, one-stage detection and two-stage detection. One-stage detection includes making a fixed number of predictions on a grid, mapping features directly to bounding boxes and classification scores in a single stage. Two-stage detection includes leveraging a proposal network to find objects, and then using a second network to fine-tune the proposals to determine a final prediction. Two-stage detectors generally require more inference time than one-stage detectors, and more complex training. One-stage detectors can be faster and easier to operate than two-stage detectors.

Examples of one-stage detectors include You Only Look Once (YOLO) and single shot detector (SSD). The YOLO system models detection as a regression problem by dividing the image into a regular grid and performing computations on each grid cell. For each grid cell, a number of bounding boxes is predicted, along with the confidences for those boxes and the classifications of the objects in the boxes. These values are encoded as a tensor: grid size by bounding boxes/confidence scores added to the probabilities. SSD predicts category scores for a fixed set of default bounding boxes using convolutional filters applied to feature maps. SSD convolution filters are smaller than YOLO convolutional filters. SSD provides predictions from different feature maps of different scales, and provides separate predictors for different aspect ratios. Examples of two-stage detectors include region-based convolutional neural network (R-CNN) and region-based fully convolutional network (R-FCN). The R-CNN proposal generator is a box classifier. Run time is dependent upon the proposals. R-FCN includes position-sensitive region-of-interest pooling.

The results of the object detection process can be refined by semantic segmentation which can be used to partition a scene by labeling each pixel in the image with semantics. Semantic segmentation systems include, for example, but not limited to, Seg-Net, U-NET, and DeepLab. Seg-Net uses an encoder-decoder framework and a pixel-wise classification layer. The encoder extracts feature maps, and the decoder recovers feature map resolution. The decoder upsamples low resolution encoder feature maps to full input resolution feature maps for classification. The non-linear upsampling uses polling indices computed in the max-pooling step of the encoder. U-Net also uses an encoder-decoder architecture, but U-Net uses three convolution blocks, while Seg-Net uses five convolution blocks. A classification label is assigned to each pixel. DeepLab uses convolutions with upsampled filters, and allows the user to explicitly control the resolution at which feature responses are computed.

When multiple sensors, and multiple types of sensors are used for real-time object detection, much attention has been focused on accurate calibration among the sensors. Some methods for fusing data from various sensors include calibrating using checkerboard patterns in which the calibration method is based on nonlinear least-squares optimization. The Levenberg-Marquardt algorithm can be used to improve calibration accuracy when transforming LiDAR and camera coordinates. Some methods find a target object because each sensor automatically detects the center of the object and circles on a plane. Descriptions of these approaches can be found in Kumar et al., LiDAR and Camera Fusion Approach for Object Distance Estimation in Self-Driving Vehicles, Symmetry 2020, 12(2), 324, https://doi.org/10.3390/sym12020324, Feb. 24, 2020.

What is needed is a system that can detect characteristics of possibly distant objects in real time from sensors located on a navigating AV.

SUMMARY

The system and method of the present teachings can perform real-time object characteristics detection based on sensor data associated with a navigating autonomous vehicle. The system can include, but is not limited to including, sensors to receive image and point cloud data, machine learning models to identify bounding boxes including objects, object classifications, and non-background/background pixels, an object segregator that can sort the bounding box data based on which camera produced the image that includes the bounding box, and a positioner to determine the 3D location and size of the object.

The method for determining size and location of at least one object surrounding an autonomous vehicle (AV) in real time can include, but is not limited to including, receiving sensor data from at least one sensor associated with the AV, determining at least one bounding box, classification, and confidence score representing the at least one object located within the sensor data, associating the at least one bounding box with the at least one sensor, receiving point cloud data temporally and geographically associated with the at least one bounding box, classifying pixels in the at least one bounding box in the sensor data as non-background pixels or background pixels, and determining a location and a size of the at least one object based on a relationship between an amount of the non-background pixels and the background pixels and the point cloud data.

The at least one sensor can optionally include at least one camera. The at least one camera can optionally include at least four long range cameras. Determining at least one bounding box, classification, and confidence score can include, but is not limited to including, providing the sensor data to a real-time object detection inference engine. The object detection inference engine can optionally include a one-stage detector. Determining the at least one non-background classification and the at least one background classification can optionally include providing the sensor data to a semantic segmentation inference engine. The semantic segmentation inference engine can optionally include an encoder-decoder framework. The method can optionally include filtering the background pixels and the non-background pixels. Filtering can optionally include a median filter and/or a mode filter.

The system for determining size and location of at least one object surrounding an autonomous vehicle (AV) in real time can include, but is not limited to including, a bounding box processor receiving sensor data from at least one sensor associated with the AV. The bounding box processor can determine at least one bounding box, classification, and confidence score representing the at least one object located within the sensor data. The system can include an object segregator associating the at least one bounding box with the at least one sensor, a class processor classifying pixels in the at least one bounding box in the sensor data as non-background pixels or background pixels, and a 3D positioner receiving point cloud data temporally and geographically associated with the at least one bounding box. The 3D positioner can determine a location and a size of the at least one object based on a relationship between an amount of the non-background pixels and the background pixels and the point cloud data.

The at least one sensor can optionally include at least one camera, and the at least one sensor can optionally include four long range cameras. The bounding box processor can optionally include being configured to providing the sensor data to a real-time object detection inference engine. The object detection inference engine can optionally include an SSD engine. The 3D positioner can optionally include being configured to provide the sensor data to a semantic segmentation inference engine. The semantic segmentation inference engine can optionally include a U-NET engine. The at least one filter can optionally be configured to filter the background pixels and the non-background pixels. The at least one filter can optionally include a median filter and/or a mode filter.

BRIEF DESCRIPTION OF THE DRAWINGS

The present teachings will be more readily understood by reference to the following description, taken with the accompanying drawings, in which.

DETAILED DESCRIPTION

The system and method of the present teachings can detect objects in two dimensions, semantically segment the objects, position the objects in three dimensional space, fine-tune the three dimensional object positions, and calculate the size of the objects. The AV can be fitted with sensors that can detect objects surrounding the AV. For example, images that are streamed from cameras can be used to detect bounding box locations for dynamic (possibly movable) objects in 2D image co-ordinates. The present teachings contemplate other types of sensors used to detect objects. In some configurations, the sensors can include long range cameras, and the sensors are positioned in a pre-selected way upon an autonomous device (AV). For example, the sensors can receive data around a certain amount of the AV, the amount being based upon the specific application of the object detection. For example, the AV can be limited to detecting objects directly in its forward path, thus limiting the required data collection to, for example, a 45° forward field of view. In situations where the AV requires data from the sides and rear as well as the front, a 360° field of view might be necessary. Larger fields of view might require multiple sensors. The system of the present teachings contemplates the use of any number of sensors.

Figure 1:
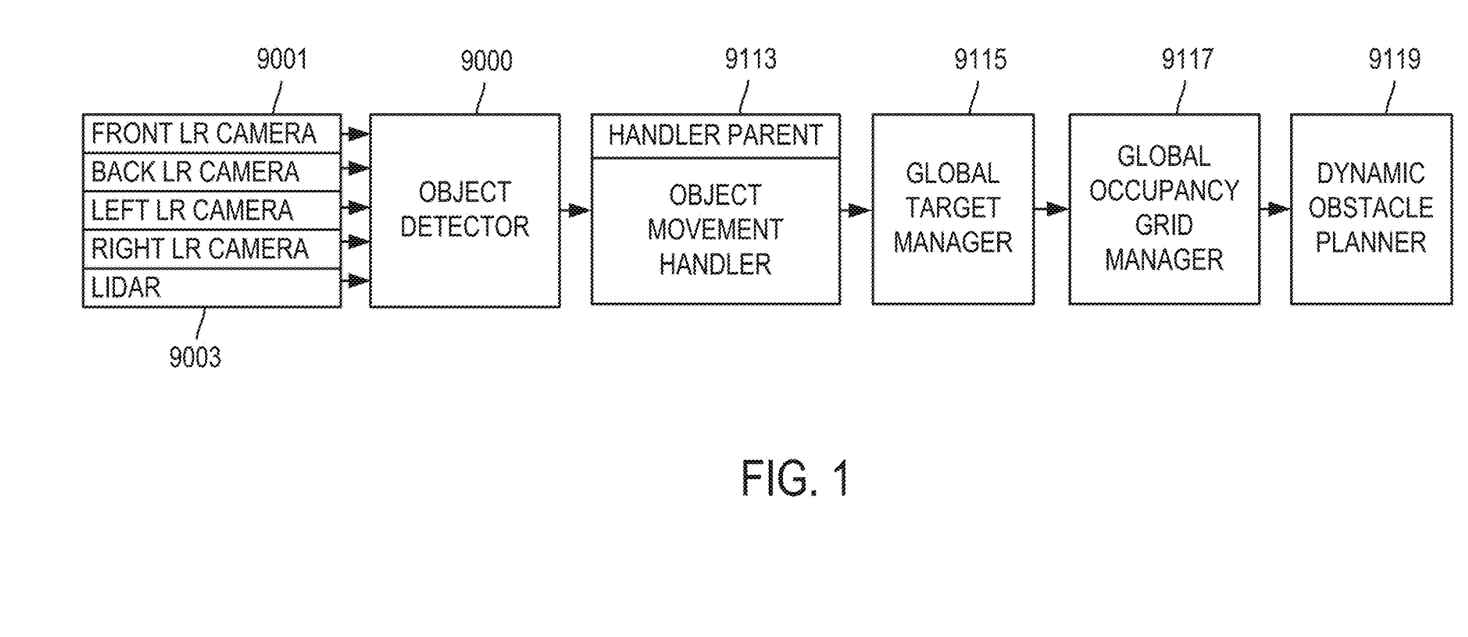
FIG. 1 is a schematic block diagram of an exemplary system for autonomous navigation including the object detection system of the present teachings.

Referring now to FIG. 1, object detector system 9000 of the present teachings receives sensor data, and provides the detected objects to object movement handler 9113. Object movement handler 9113 tracks dynamic objects if necessary, and provides both static and dynamic objects to global target manager 9115. Global target manager 9115 prepares the located objects for entry on an occupancy grid, and then provides the objects to global occupancy grid manager 9117. Global occupancy grid manager 9117 populates a global occupancy grid with the objects, and provides the global occupancy grid to dynamic obstacle planner 9119 which can enable the AV to avoid the obstacles. Sensor data can, in some configurations, include cameras 9001 and LiDAR 9003. The movement of the detected objects can be tracked by object movement handler 9113, which can supply that information to global target manager 9115. Global occupancy grid manager 9117 can use the information collected to determine the probability that the path of the autonomous device is obstructed, and can provide that information to dynamic obstacle planner 9119 which can enable safe directional movement of the autonomous device.

Figure 2:
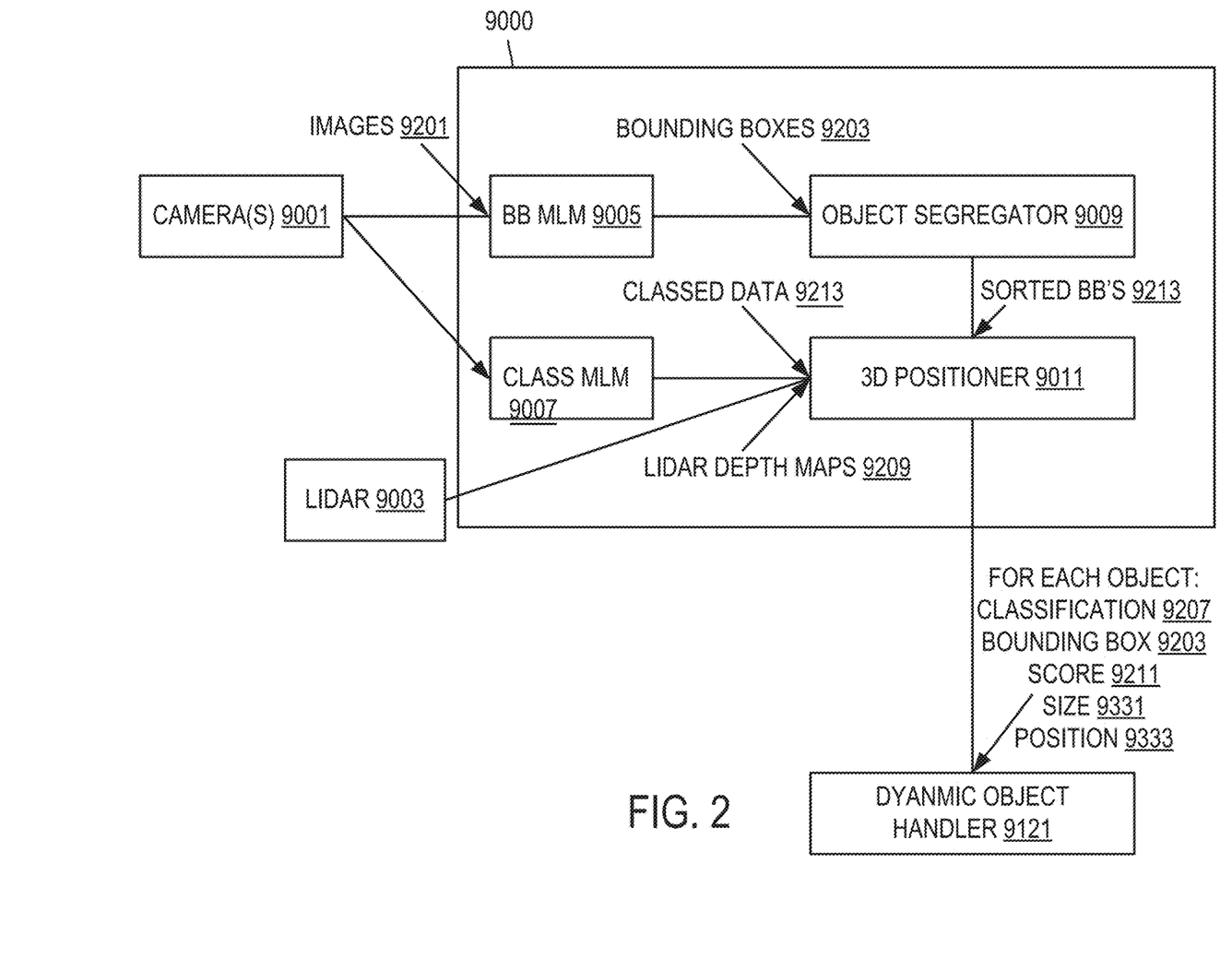
FIG. 2 is a pictorial representation of the camera vision system of the autonomous device of the present teachings.

Referring now to FIG. 2, in some configurations, object detector system 9000 (FIG. 1) for identifying objects can include real-time object detection model 9005, for example, but not limited to, the models described by Pal, S. et al., Real-time Object Detection using Deep Learning: A Survey, International Research Journal of Engineering and Technology, vol. 6:10, October 19), incorporated herein by reference in its entirety. Real-time object detection model 9005 is a machine learning model (MLM) that can detect bounding boxes surrounding objects from sensor data. Real-time object detection model 9005, in some configurations, can be performed by a one-stage detector such as, but not limited to, an SSD detector. SSD as described by Liu, W. et al., SSD: Single Shot Multibox Detector, arXiv:1512.02325v5 [cs.CV] Dec. 29, 2016, incorporated herein by reference in its entirety, can be used, in some configurations. SSD detects objects, performs object localization and classification in a single pass, regressing an object's coordinates to its ground truth coordinates, and classifies the detected objects. SSD can overlay multiple prior boxes on the image, classify each of the prior boxes according to the presence of an object, and regress the prior box bounding box coordinates according to the object.

Continuing to refer to FIG. 2, various object detection models can enable specific training processes. For example, the AMAZON SAGEMAKER® machine learning platform allows a choice of a training algorithm. Training algorithms that can be chosen that are relevant to object detection include semantic segmentation, object detection, image classification. Object detection models can be pre-trained. For example, the tensorflow 2 detection model offers a collection of pre-trained models that each provides a different output and arrives at the outputs at various speeds. Examples of families of pre-trained models include SSD MobileNet and SSD ResNetxxx, each geared to a certain data size, like 320×320 or 1024×1024. In an exemplary configuration, real-time object detection model 9005 is trained by assigning positive and negative examples for the respective object types. Other training techniques are contemplated by the present teachings.

Continuing to refer to FIG. 2, in some configurations, tuning parameters can be determined automatically, for example, hyperparameter tuning which tunes by running many jobs that test a range of hyperparameters on a dataset. Further, certain metrics can be chosen as parameters to tune, for example, mean average precision computed on the validation set. The chosen object detection model can be associated with various parameters that have the greatest impact on the tuning of a chosen object detection metric. Exemplary parameters can include, but are not limited to including, number of output classes, number of training samples, and image shape. In an exemplary configuration, tuning parameters for real-time object detection model 9005 can be determined empirically and can be set to achieve as low a loss as possible without overfitting training data.

Continuing to refer to FIG. 2, in some configurations, the sensors can sense, but are not limited to sensing, images 9201. Images 9201 can be received from sensors such as, for example, but not limited to, metal-oxide-semiconductor technology such as, for example, but not limited to, charge coupled devices and active-pixel sensors. In some configurations, image sensors including analog and digital sensors, for example digital camera(s) 9001, supply images 9201 to real-time object detection model 9005. The image sensor can provide an image sized according to the requirements of the sensor and the object detection model. The image sensor can produce an image of size 512×512×3, for example. The present teachings contemplate other image sizes.

Continuing to refer to FIG. 2, a bounding box machine learning model (BB MLM) can provide a list of objects with confidence scores. The BB MLM splits an image into a grid of cells, where each cell predicts a bounding box if the center of the cell falls within the bounding box. The bounding box's predicted characteristics include, but are not limited to including, x/y coordinates of the box, the width and height of the box, and the confidence that the box does surround an object of interest. The confidence score reflects how likely it is that the bounding box contains an object and how accurate the bounding box is. If no object exists in the cell, the confidence score is zero. The confidence score depends upon an evaluation metric used to measure the accuracy of the object detector, and the probability that the bounding box includes an object. The evaluation metric is computed by comparing ground truth bounding boxes to predicted bounding boxes. The ratio of the intersection of the ground truth and predicted boxes to the union of the ground truth and predicted boxes represents one way to compute the evaluation metric. Conditional class probabilities score the probability that the detected object belongs to a particular class. In an exemplary configuration of the present teachings, BB ML 9005 can provide bounding boxes 9203 to object segregator 9009 when the confidence scores are greater than a pre-selected value. In some configurations, the pre-selected value can include, but is not limited to including, 0.5. In some configurations, BB MLM 9005 can detect a pre-selected list of objects. In some configurations, the pre-selected list can include, but is not limited to including, bikes, buses, cars, motorcycles, people, (motorcycle/bike) riders, large vehicles, trains, animals, traffic officers, school buses, ambulances, police vehicles, fire engines, strollers, shopping carts, construction objects, and wheelchairs. Other objects that can be detected are contemplated by the present teachings.

Continuing to refer to FIG. 2, in an exemplary configuration, the system can include at least one image sensor. In order to correctly localize the bounding boxes, the location of the sensor providing the analyzed data (analyzed by the object detection model) is needed. In a configuration in which there are multiple image sensors, object segregator 9009 can associate the bounding boxes that are returned by BB MLM 9005 with the image sensors that originally received the images that include the bounding boxes. In an exemplary environment, each image sensor can provide data for a specific area around the AV. When the bounding boxes discovered in the image sensor data are associated with the image sensor that received the data, the locations of the bounding boxes can be associated with a specific range of locations.

Continuing to refer to FIG. 2, the objects in the bounding boxes are surrounded by other information that is termed herein background information. In some configurations, the background information can include any data found outside the bounding boxes. In some configurations, background pixels can be determined by assessing the intensity and gradient of regions in the image. For example, high intensity, low gradient regions can correspond to background, while medium intensity, high gradient regions can correspond to object edges. Thresholds of pixel numbers can be used. A Gaussian distribution that adapts to slow changes by recursively updating the model can be used to locate background pixels. Non-background pixels can be determined by frame differencing, and background can be identified as all pixels that are not determined to be non-background pixels. A semantic segmentation model such as one of the models found in Thoma, M., A Survey of Semantic Segmentation, arXiv:1602.06541c2 [cs.CV] May 11, 2016, which is incorporated herein in its entirety, can be used to detect and classify background and non-background from the images. In some configurations, semantic segmentation can be performed according to the process associated with U-Net, a convolutional neural network, described in Ronneberger, O., et al., U-Net: Convolutional Networks for Biomedical Image Segmentation, arXiv:1505.04597v1 [cs.CV] May 18, 2015, which is incorporated herein in its entirety. In the exemplary configuration described herein, classification MLM 9007 can include semantic segmentation to detect and classify data 9213 from the sensor data.

Continuing to refer to FIG. 2, classified background and non-background data can be used by 3D positioner 9011 as a mask for objects detected by BB MLM 9005 as discussed herein. Non-background information can include a general category of foreground, or more specific categories of vehicles and people. This masking can improve position estimation by filtering the LiDAR points that fall within the bounding box. LiDAR points falling within the non-background class can be retained, while LiDAR points falling within in the background class can be filtered out. In some configurations, LiDAR points falling within vehicle and/or person class can be retained. Other specific types are contemplated by the present teachings to be retained, depending upon the application.

Figure 3:
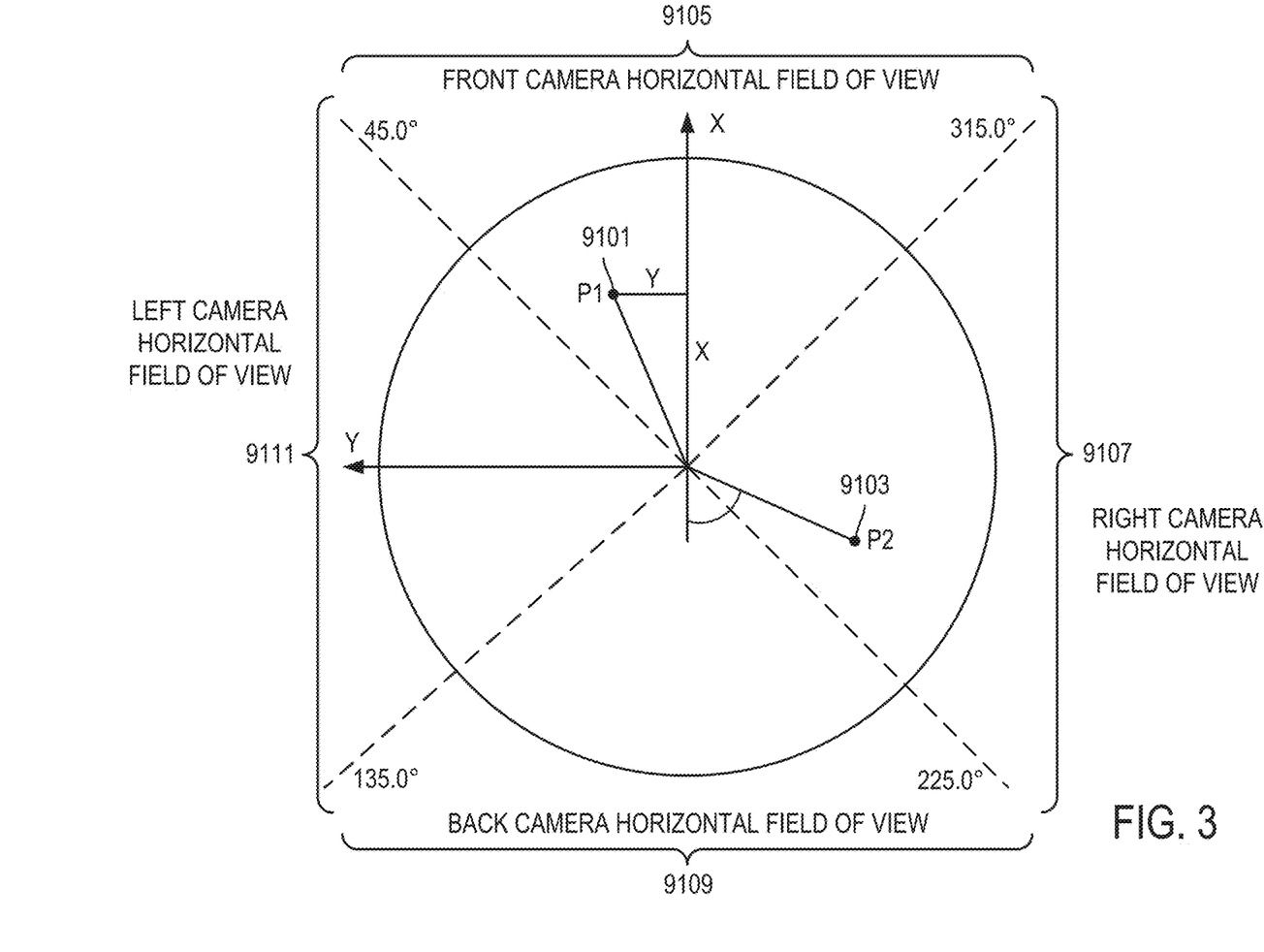
FIG. 3 is pictorial representation of the camera orientations of the autonomous device of the present teachings.

Referring now to FIG. 3, in an exemplary configuration of the present teachings, cameras can be positioned on the AV to cover the entire surroundings of the AV. Other configurations are contemplated by the present teachings. For example, other sensors besides cameras could be positioned likewise, or a mixture of types of sensors. In some configurations, cameras can be positioned at the corners of the AV. In some configurations, cameras can be positioned only on the front and rear, or only at the sides. In some configurations, object segregator 9009 (FIG. 2) can sort the objects in bounding boxes 9203 (FIG. 2) according to which of sensors 9001 produced the image that includes the object. A possible sensor configuration can include a front camera, a right camera, a left camera, and a rear camera, together providing 360° coverage of the environment surrounding the AV. The front camera can provide front field of view 9105, from 45° in the negative (counterclockwise) direction when viewed from above the AV to 315° in the positive direction. The right camera can provide right camera field of view 9107, from 315° to 225°. The rear camera can provide field of view 9109 from 225° to 135°, and left camera field can provide field of view 9111 from 135° to 45°. For example, point 9101 was provided by the front camera, while point 9103 was provided by the right camera.

Figure 4:
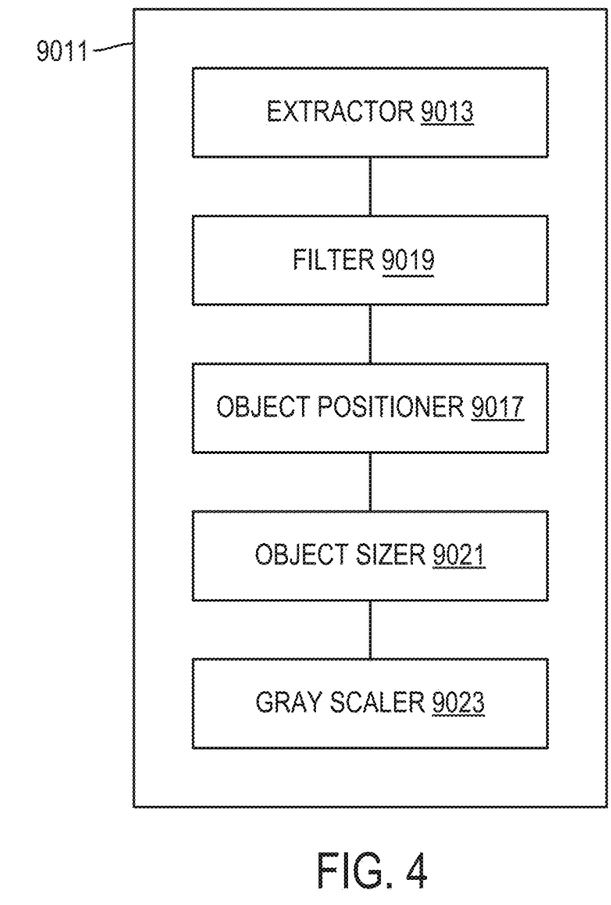
FIG. 4 is a schematic block diagram of an embodiment of the 3D positioner of the present teachings.

Referring to FIG. 4, an exemplary configuration of 3D positioner 9011 can perform various functions, and can include components that can be specialized to perform the functions. In some configurations, the functions can be performed by a different combination of components, or a single component. The divisions of components shown in FIG. 4 are for illustrative and descriptive purposes only. Other configurations are contemplated by the present teachings. 3D positioner 9011 can position each object in 3D space based on LiDAR data and the size of the object. For each image, LiDAR points corresponding to the image's position are overlain upon the image. Each object in each camera image can possibly overlap with LiDAR points. The LiDAR points can be used to determine the 3D positions of the objects and the bounding boxes. The LiDAR points can fall into either the background or non-background of the image as determined by the locations of the background and non-background pixels in the image. Which LiDAR points are used to determine the positions of the objects can be determined based on the ratio of LiDAR points that are in the non-background relative to LiDAR points that are in the background in each bounding box. In the exemplary configuration, the sensor data supplied to 3D positioner 9011 can be extracted by extractor 9013, and filter 9019 can filter the data according to one or more filtering strategies. For example, the data can be filtered according to their median distance from the AV. Further functions that can be performed by 3D positioner 9011 can include positioning the objects, sizing the objects, and adjusting confidence scores. These functions are described further herein.

Figure 5:
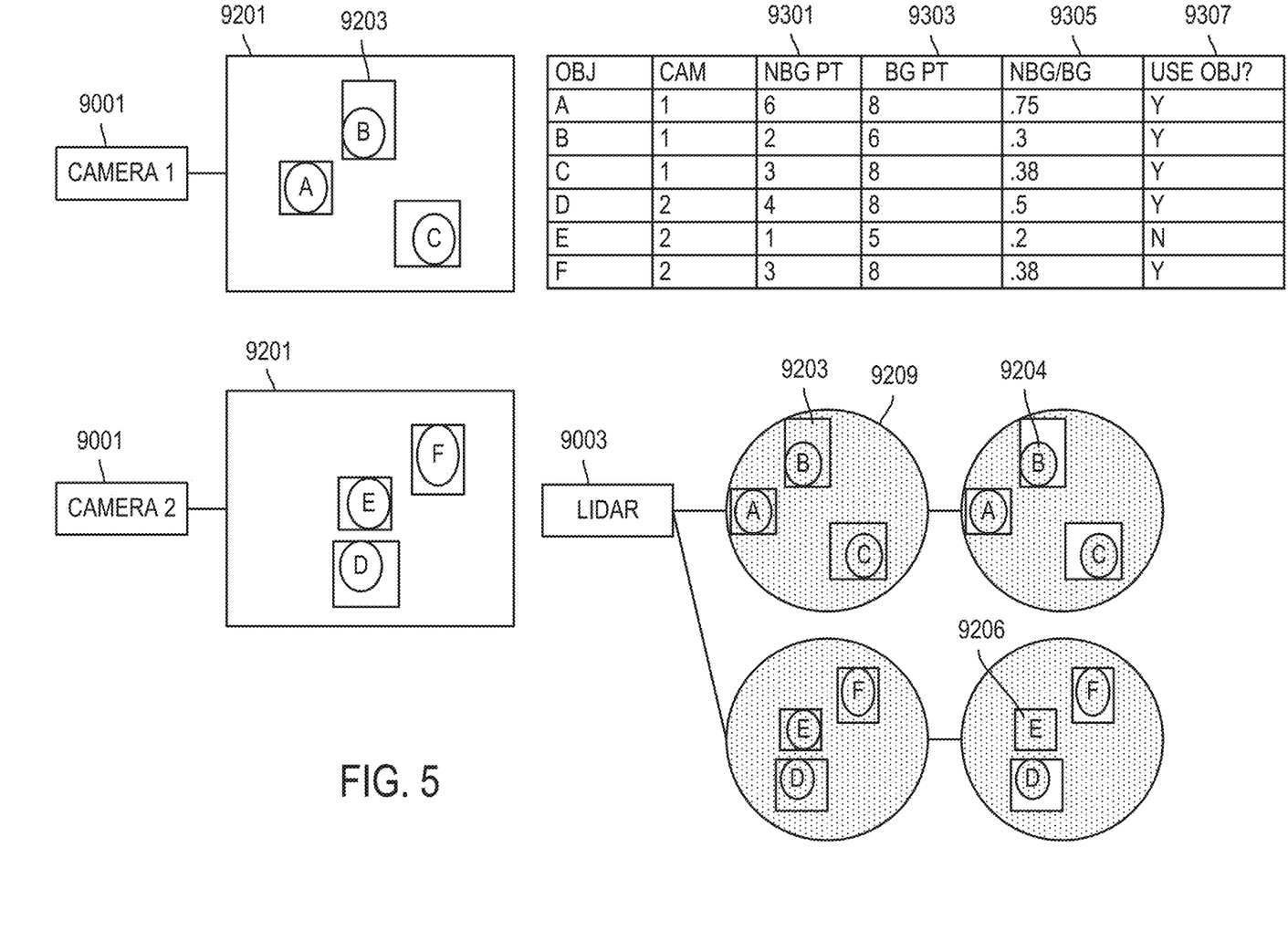
FIG. 5 is a pictorial representation of the segmentation of the present teachings.

Referring now to FIG. 5, the point examination of sensor points, for example, LiDAR points, includes determining whether to use the LiDAR points within the object bounds or to use the LiDAR points within the object bounding box, and is based on maximizing the number of possible LiDAR points to gain the most accurate location and size of the object. This determination of whether to use the LiDAR points within the object bounds or the LiDAR points within the bounding box is made by comparing the number of LiDAR points in the non-background of the image to the number of LiDAR points in the background of the image. When 9307 ratio 9305 of LiDAR points in the non-background 9301 to LiDAR points in the background 9303 is greater than or equal to a pre-selected threshold such as, for example, but not limited to, 0.25, the LiDAR points within object 9204 can be examined. Otherwise 9307, the LiDAR points within the bounding box 9206 can be examined. The example shown in FIG. 5 includes two sensors 9001, each presenting an image 9201 having three possible objects 9204 and their bounding boxes 9203. Objects 9204 include non-background points while bounding boxes 9203 except for object 9204 and the rest of image 9201 include background points. When LiDAR points 9209 are overlain on objects 9204, each object 9204 includes a number of LiDAR points in non-background 9301 and each bounding box 9203 includes a number of LiDAR points in background 9303. Ratio 9305 of non-background to background points can indicate whether to use the non-background (object) points to make future calculations (such as for objects A, B, C, D, and F), or whether to use all the points in the bounding box to make future calculations (such as for object E). After this determination has been made, the system can proceed examining the object to determine its location and size.

Figure 6:
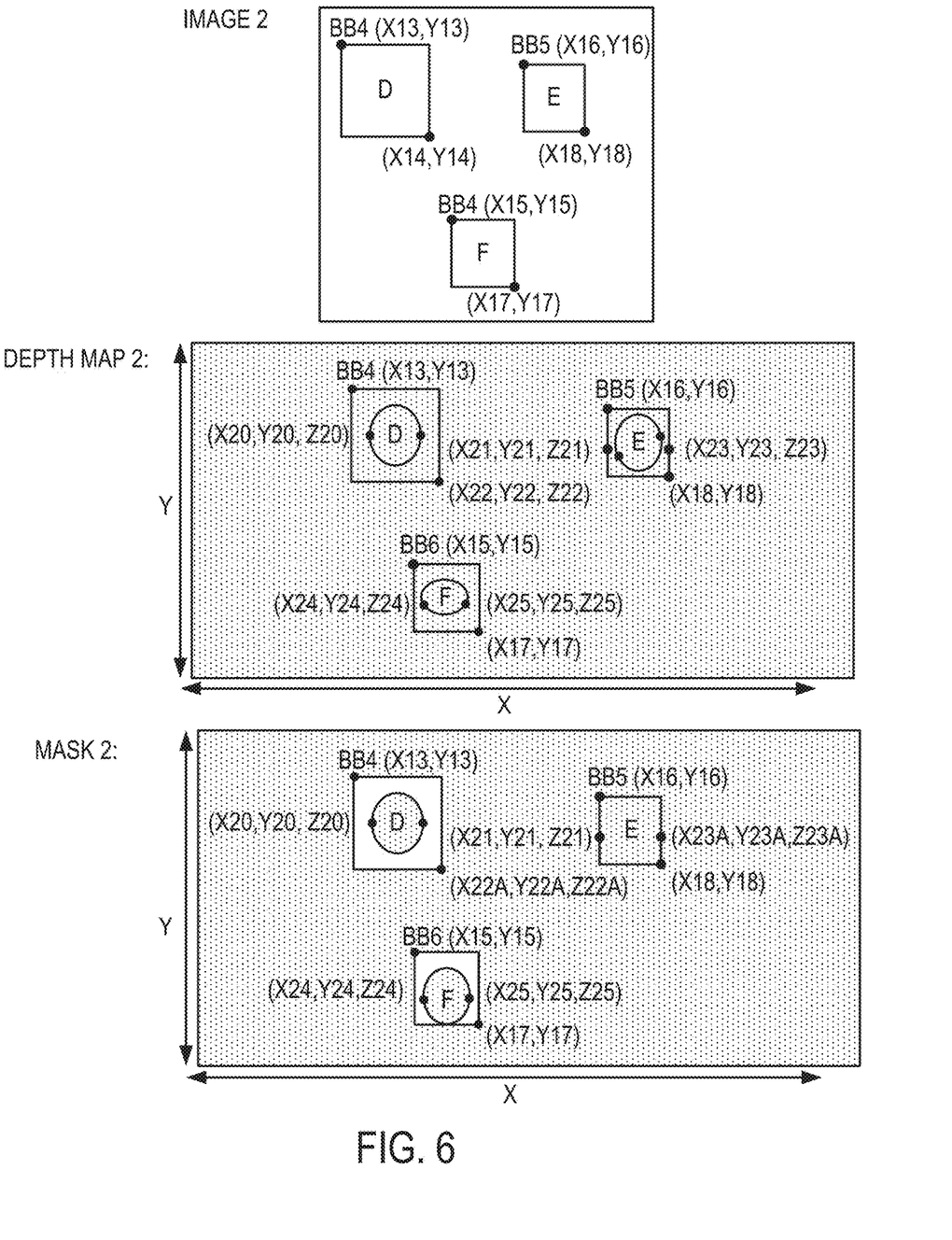
FIG. 6 is a pictorial representation of the masking of the present teachings.
Figure 7:
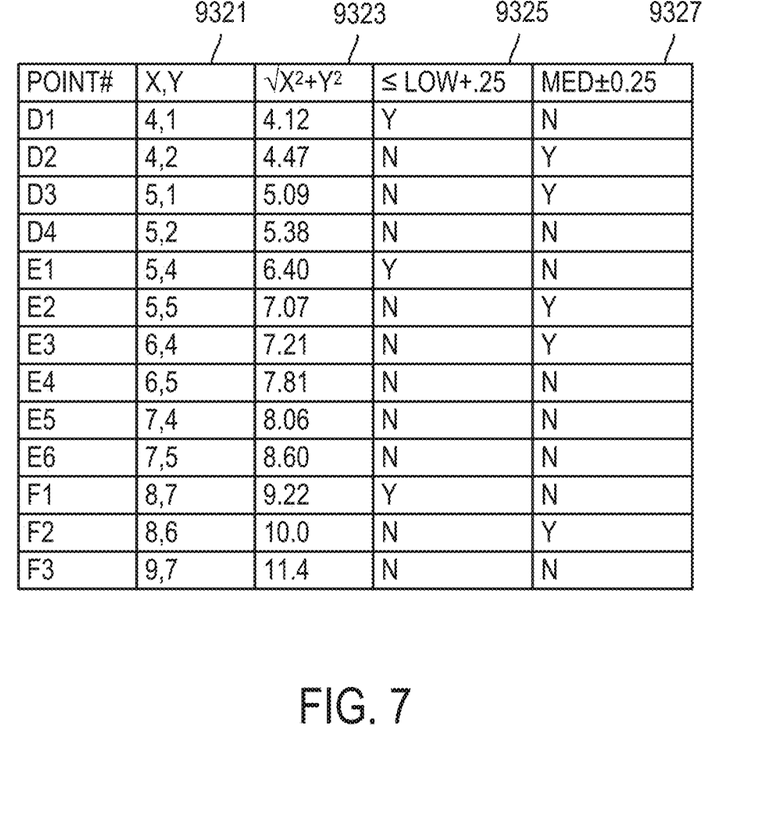
FIG. 7 is a table enabling point filtering of the present teachings.

Referring now to FIGS. 6 and 7, the examination begins with sorting the LiDAR points (having coordinates x, y, z) 9321 (FIG. 7) according to their Euclidian distances (sqrt $(x^2+y^2+z^2)$) in the baselink frame from the center of the AV. In some configurations, the Euclidian distances (sqrt$(x^2+y^2)$) 9323 (FIG. 7) in a surface plane adequately represent the point distances. In some configurations, points that represent obstacles that are greater than the minimum distance from the AV plus a pre-selected amount such as, for example, but not limited to, 0.25 m, are discarded. In some configurations, points that represent obstacles that are farther than the median distance from the AV plus or minus a pre-selected amount, such as, for example, but not limited to, 0.25 m, are discarded. Other strategies for discarding (filtering) points can be utilized. In the example laid out in FIGS. 5-7, object D includes four non-background points, D1-D4 (FIG. 7), and object F includes three non-background points, F1-F3 (FIG. 7). Object E includes bounding box and object LiDAR points, and includes five points, E1-E5 (FIG. 7). In this example, if minimum distance filter 9325 is implemented, for object D, point D1 would be retained, and points D2-D4 would be discarded. Likewise, for object E, point E1 would be retained, and points E2-E6 would be discarded. With respect to object F, point F1 could be retained, and points F2 and F3 would be discarded. In this example, if median distance filter 9327 is implemented, for object D, points D2 and D3 would be retained and points D1 and D4 would be discarded. For object E, points E2 and E3 would be retained and points E1 and E4-E6 would be discarded. For object F, point F2 would be retained and points F1 and F3 would be discarded.

Referring to FIG. 7, object positioner 9017 can sort the remaining LiDAR points according to their distances from the AV. Object positioner 9017 can determine the location of the object by any means, including, but not limited to, computing the mean of the remaining LiDAR points, which can represent the object's location. In the example shown, if median distance filter 9327 is implemented, the distance between object D and the AV would be computed as choosing one of the two values, or a value halfway between the two, (D2+D3)/2=4.78 m (the same as the mean in this simple case of two values). Likewise, the distance between object E and the AV would be computed as (E2+E3)/2=7.14 m. And the distance between object F and the AV is 10 m.

Figure 8:
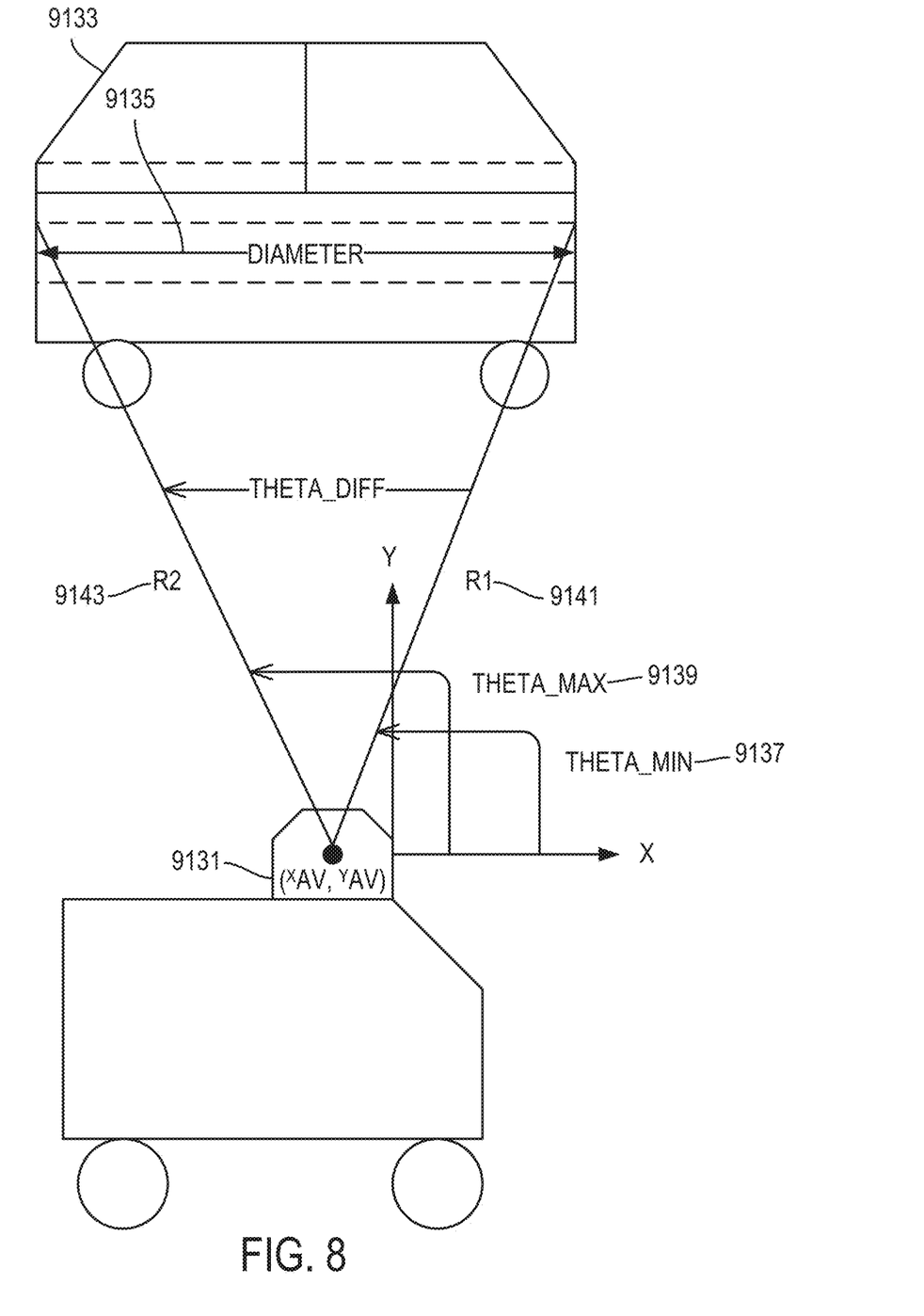
FIG. 8 is a pictorial representation of the object sizing means of the present teachings.

Referring to FIG. 8, object sizer 9021 (FIG. 4) can determine the size of the object by locating the extreme LiDAR points associated with the object, i.e. the LiDAR points that are the farthest from each other on the edges of the object, for example, points ($x_{20}$, $y_{20}$, $z_{20}$) (FIG. 6) and ($x_{21}$, $y_{21}$, $z_{21}$) (FIG. 6) with respect to object D (FIG. 6), points ($x_{22a}$, $y_{22a}$, $z_{22a}$) (FIG. 6) and ($x_{23a}$, $y_{23a}$, $z_{23a}$) (FIG. 6) with respect to object E, and points ($x_{24}$, $y_{24}$, $z_{24}$) (FIG. 6) and ($x_{25}$, $y_{25}$, $z_{25}$) (FIG. 6) with respect to object F. These values can be used to determine the sizes of the objects. Calculating size 9135 of at least one object 9133 can be based at least on the filtered points as described herein. Calculating size 9135 can include determining $\theta_{min}$ 9137, $\theta_{max}$ 9139, $r_1$ 9141, and $r_2$ 9143 of the angles formed by the filtered points, the sensor location points ($x_{AV}$, $y_{AV}$), and a horizontal line drawn from the sensor, and using these values to calculate size 9135. For example, if object D (FIG. 6) is considered in two dimensions, then $$r_1 = sqrt((x_{20} - x_{AV})^2 + (y_{20} - y_{AV})^2)$$

$$r_2 = sqrt((x_{21} - x_{AV})^2 + (y_{21} - y_{AV})^2)$$

size of object D (diameter of object D)=$sqrt(r_1^2 + r_2^2 - 2r_1 r_2 \cos \theta_{diff})$ where $\theta_{diff} = \theta_{max} - \theta_{min}$ Referring again to FIG. 2, for each object, 3D positioner 9011 provides object classification 9207 (from BB MLM 9005), object bounding box 9203 (from BB MLM 9005), confidence scores 9211 (from BB MLM 9005 as modified), object size 9331 (as laid out herein), and object position 9333 (as laid out herein). In some configurations, 3D positioner 9011 provides object information to dynamic object handler 9121, for example, which would provide further information to a system such as the system described in FIG. 1 that would enable navigating around obstacles.

Referring again to FIG. 4, confidence scores 9211 can be improved by recognizing that LiDAR emits laser light and measures the reflection from an object. Since darker objects, for example, but not limited to, dark-shaded vehicles, tend to have a lower reflectivity, LiDAR emits fewer returns from a dark-shaded object as compared to a lighter-shaded object. If it is known whether an object is relatively dark-shaded, confidence scores 9211 can be adjusted. A grayscale value can provide the needed information. Gray scaler 9023 can adjust confidence scores 9211 by cropping bounding boxes 9203 out of images 9201, converting the cropped image to gray scale, extracting gray scale values at LiDAR locations as described herein, and averaging the extracted gray scale values to obtain the gray scale of the object. The gray scale can be used to raise the confidence level for darker objects.

Figure 9:
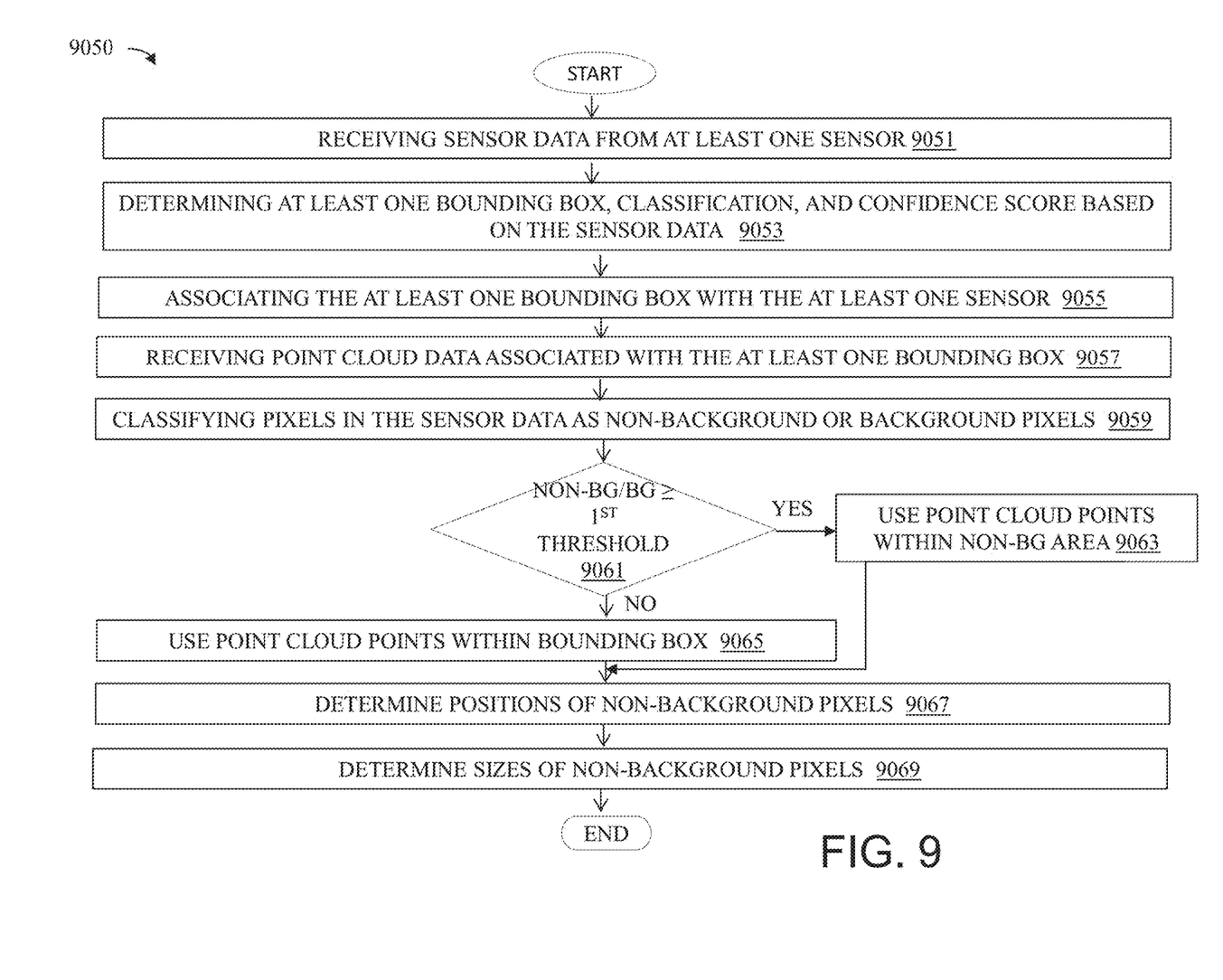
FIG. 9 is a flowchart of an embodiment of the object detection method of the present teachings.

Referring now to FIG. 9, object detection can include, but is not limited to including, processing long-range sensor data to provide bounding box locations in 2D image coordinates for objects in the field of view of the AV, locating the objects in 3D space, fine-tuning the 3D positions, and calculating the sizes of the objects. In some configurations, object detection is performed on a batch of images from long range cameras mounted on the AV. In some configurations, the images can be received into a buffer filled synchronously, and inference and semantic segmentation can be performed on the images in the buffer. The buffer can be cleared after every inference. In some configurations, a check for blank images can prevent executing inference on blank images. Detected objects can be associated with the camera from which they were detected. Detected objects can each include 2D coordinates associated with their bounding boxes, their prediction confidence, their object labels, and the identifications of their associated cameras.

Continuing to refer to FIG. 9, method 9050 for detecting objects can include, but is not limited to including, receiving 9051 sensor data from at least one sensor, determining 9053 at least one bounding box, classification, and confidence score based on the at least one image, and associating 9055 the at least one bounding box with the at least one sensor. Method 9050 can include receiving 9057 point cloud data associated with the at least one bounding box, and classifying 9059 the sensor data as background or non-background pixels. If 9061 the ratio of non-background to background data is greater than or equal to a pre-selected threshold, method 9050 can include using 9063 point cloud points within the non-background area for further computation about the object. If 9061 the ratio of non-background to background data is less than a pre-selected threshold, method 9050 can include using 9065 point cloud points within the at least one bounding box for further computation about the object. Method 9050 can include determining 9067 positions of the non-background pixel objects based at least on their distance from the AV, and determining 9069 sizes of the non-background pixel objects based at least on the point cloud points associated with the object. Each sensor can provide a stream of sensor data. For example, if the sensor is a camera, the sensor provides a stream of images. Object bounding boxes, object classifications, and confidences can be determined by a machine learning model, as described herein, for example, an SSD model. Pixels in the image can be classified as non-background or background by another machine learning model, as described herein, for example a U-NET model. The bounding boxes that are returned from the model are segregated according to which camera provided the image including the bounding box.

Continuing to refer to FIG. 9, associating contemporaneous point cloud points with each of the at least one image can include determining the positions of the pixels that represent the objects in the bounding boxes by geographically associating the point cloud points with the bounding boxes. Point cloud points can be provided, for example, by LiDAR, which provides depth maps corresponding in time with the sensor data. The depth map can be determined from the LiDAR point cloud by calculating transformation and projection matrices for each camera. LiDAR point cloud to image and image to AV frame are the transformations that can result from the matrices. The depth map determination can include classifying each LiDAR point to one of the long range cameras according to the angle it subtends with the zero axis of the LiDAR device associated with the AV. The transformation matrices can be different from each other based on the images. Each LiDAR point is transformed from the 3D LiDAR frame to a 3D image frame using the transformation matrix from LiDAR to image frame. The LiDAR points in the 3D image frame are projected to a 2D image frame using the projection matrices of the cameras. The 3D LiDAR frame points are transformed to 3D AV points. At this point, the location of the 2D location LiDAR point in image frame and AV frame is known. Based on the image the object lies in, all LiDAR points that lie inside the 2D bounding box in the LiDAR depth map are considered as depth points that could possibly correspond to the object.

Continuing to refer to FIG. 9, determining the location and size of the object is based at least in part on the point cloud data. With respect to the object's location, and in order to deal with objects that are occluded and to segment the non-background from the background, semantic mask for every object is extracted from the output of U-NET inference based on the bounding box. Value 0 in the mask corresponds to background while value 1 corresponds to non-background. Object position can be determined by filtering the LiDAR points and determining the object position based on the filtered points. Filtering can include discarding points that are classified as background points if the ratio of non-background to background points surpasses a pre-selected threshold. Conversely, if the ratio does not surpass the pre-selected threshold, the background points are not discarded, and all points within the bounding box are used to determine the location of the object. Filtering can include discarding points that are greater than a pre-selected distance from either the point closest to the AV, the median value of the non-discarded points, or the mode value of the non-discarded points. Determining the mode includes replacing points with the most frequently occurring point values selected from a pre-selected window size. For example, if the number of LiDAR points that fall within what has been determined as the non-background of the image is at least 25% of the number of LiDAR points in the bounding box, all LiDAR points that are not found are classified as the non-background of the bounding box are discarded. Method 9050 can include calculating the Euclidian distance between each LiDAR point and the AV, from closest to farthest. In some configurations, the closest points are chosen determine the object's position. In some configurations, the median (or mode) of the points is determined, and all points farther than 0.25 m of the median (or mode) are discarded. Whatever points have not been discarded can be combined, for example, averaged, to determine the object's location. With respect to the object's size, the height of the object is calculated by the difference in the maximum z and the minimum z in the final list of LiDAR points. Diameter of the object is calculated as described herein with respect to FIG. 8.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software, hardware, and firmware for accomplishing the methods discussed herein, and computer readable media storing executable code for accomplishing these methods. The various modules described herein can be accomplished on the same CPU, or can be accomplished on different computers. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for determining a size and a location of an object surrounding an autonomous vehicle (AV) in real time comprising:
   receiving two-dimensional (2D) sensor data from a sensor associated with the AV;
   associating a first confidence score with each of the 2D sensor data;
   determining a bounding box, a classification, and a second confidence score representing the object located within the 2D sensor data;
   receiving point cloud data temporally and geographically associated with the bounding box;
   classifying pixels in the bounding box as non-background pixels or background pixels; and
   determining the location and the size of the object based on a relationship between an amount of the non-background pixels and the background pixels and the point cloud data;
   wherein the point cloud data are independent of the 2D sensor data.

2. The method as in claim 1 wherein the sensor comprises a camera.

3. The method as in claim 1 wherein determining the bounding box, the classification, and the confidence score comprises providing the sensor data to a real-time object detection inference engine.

4. The method as in claim 3 wherein the real-time object detection inference engine comprises a one-stage object detector.

5. The method as in claim 1 wherein classifying the pixels as the non-background pixels and the background pixels comprises providing the sensor data to a semantic segmentation inference engine.

6. The method as in claim 5 wherein the semantic segmentation inference engine comprises an encoder-decoder engine.

7. The method as in claim 1 further comprising filtering the background pixels and the non-background pixels.

8. The method as in claim 7 wherein filtering comprises a median filter.

9. The method as in claim 7 wherein filtering comprises a mode filter.

10. The method as in claim 1 wherein the sensor comprises four long range cameras.

11. A system for determining a size and a location of at least one object surrounding an autonomous vehicle (AV) in real time comprising:
   a bounding box processor configured for:
      receiving two-dimensional (2D) sensor data and a first confidence score respectively associated with each of the 2D sensor data from a sensor associated with the AV; and
      determining a bounding box, a classification, and a second confidence score representing the object located within the 2D sensor data;
   a class processor configured for classifying pixels in the bounding box as non-background pixels or background pixels; and
   a 3D positioner configured for:
      receiving point cloud data temporally and geographically associated with the bounding box; and
      determining the location and the size of the object based on a relationship between an amount of the non-background pixels and the background pixels and the point cloud data;
   wherein the point cloud data are independent of the 2D sensor data.

12. The system as in claim 11 wherein the sensor comprises a camera.

13. The system as in claim 11 wherein the bounding box processor is configured for providing the sensor data to a real-time object detection inference engine.

14. The system as in claim 13 wherein the real-time object detection inference engine comprises a one-stage object detection engine.

15. The system as in claim 11 wherein the 3D positioner is configured for providing the sensor data to a semantic segmentation inference engine.

16. The system as in claim 15 wherein the semantic segmentation inference engine comprises an encoder-decoder engine.

17. The system as in claim 11 further comprising a filter configured for filtering the background pixels and the non-background pixels.

18. The system as in claim 17 wherein the filter comprises a median filter.

19. The system as in claim 17 wherein the filter comprises a mode filter.

20. The system as in claim 12 wherein the sensor comprises four long range cameras.

21. Method of claim 1 wherein the first confidence score is based on LiDAR reflectivity.

22. System of claim 1 wherein the first confidence score is based on LIDAR reflectivity.

* * * * *